United States Patent
Nakagaki

(10) Patent No.: US 12,298,815 B2
(45) Date of Patent: May 13, 2025

(54) ELECTRONIC APPARATUS AND KEYBOARD

(71) Applicant: LENOVO (SINGAPORE) PTE. LTD., Singapore (SG)

(72) Inventor: Yoshihito Nakagaki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 18/473,270

(22) Filed: Sep. 24, 2023

(65) Prior Publication Data

US 2024/0201748 A1    Jun. 20, 2024

(30) Foreign Application Priority Data

Dec. 19, 2022 (JP) ................... 2022202108

(51) Int. Cl.
*G06F 1/16* (2006.01)

(52) U.S. Cl.
CPC .......... *G06F 1/1669* (2013.01); *G06F 1/1675* (2013.01); *G06F 1/1679* (2013.01); *G06F 1/1671* (2013.01)

(58) Field of Classification Search
CPC .... G06F 1/1669; G06F 1/1662; G06F 1/1616; G06F 1/1656; G06F 1/1613; G06F 1/1671; G06F 1/1675; G06F 1/1679; H01H 2223/028; H01H 2223/014
See application file for complete search history.

(56) References Cited

U.S. PATENT DOCUMENTS

| | | | | |
|---|---|---|---|---|
| 5,966,284 A * | 10/1999 | Youn | ..................... | G06F 1/1669 361/679.17 |
| 6,320,743 B1 * | 11/2001 | Jin | ........................ | G06F 1/1656 361/679.08 |
| 6,970,347 B2 * | 11/2005 | Schlesener | ............ | G06F 1/1662 400/82 |
| 7,091,955 B2 * | 8/2006 | Kramer | ................. | G06F 3/0219 361/679.16 |
| 7,102,878 B2 * | 9/2006 | Yu | ........................ | G06F 3/0489 400/82 |

(Continued)

FOREIGN PATENT DOCUMENTS

| | | | |
|---|---|---|---|
| JP | 02113369 U | 9/1990 | |
| JP | 03024046 U | 3/1991 | |

(Continued)

*Primary Examiner* — Rockshana D Chowdhury
*Assistant Examiner* — Martin Antonio Asmat Uceda
(74) *Attorney, Agent, or Firm* — SHIMOKAJI IP

(57) ABSTRACT

An electronic apparatus includes a main body chassis and a keyboard attachable to and detachable from a recessed portion that is recessed downward from a main body upper surface of the main body chassis. A keyboard chassis of the keyboard is provided with a puller mechanism. The puller mechanism includes a rail extending in parallel to the main body upper surface, a slider guided by the rail, and an elastic band provided above the rail, a left end of which is fixed to the slider and a right end of which is fixed to the keyboard chassis. The elastic band is linear and extends along the upper surface in a natural state without an external force, and is elastically curved by the left end being displaced to the right together with the slider along the rail to protrude over the upper surface.

8 Claims, 9 Drawing Sheets

(56) References Cited

U.S. PATENT DOCUMENTS

| | | | |
|---|---|---|---|
| 8,625,263 B2* | 1/2014 | Pu | G06F 1/1669 |
| | | | 248/533 |
| 11,388,966 B2* | 7/2022 | Balmer | A45C 15/00 |
| 2007/0201194 A1* | 8/2007 | Chen | G06F 1/1616 |
| | | | 361/679.09 |
| 2011/0309117 A1* | 12/2011 | Roberts | H04B 1/3888 |
| | | | 224/217 |
| 2019/0055062 A1* | 2/2019 | Winn | B65D 23/104 |
| 2019/0196551 A1* | 6/2019 | Wang | H01R 13/635 |
| 2019/0246510 A1 | 8/2019 | Vertiv | |
| 2024/0094781 A1* | 3/2024 | Patel | G06F 3/0202 |

FOREIGN PATENT DOCUMENTS

| | | |
|---|---|---|
| JP | 09101842 A | 4/1997 |
| JP | 10040895 A | 2/1998 |
| JP | 2003509735 A | 3/2003 |
| JP | 2007183836 A | 7/2007 |
| JP | 2020518943 A | 6/2020 |

\* cited by examiner

ELECTRONIC APPARATUS AND KEYBOARD

BACKGROUND OF THE INVENTION

Field of the Invention

The present invention relates to a main body chassis, a keyboard attachable to and detachable from the main body chassis, and an electronic apparatus including the keyboard.

Description of the Related Art

A laptop computer in Japanese Unexamined Patent Application Publication No. 2007-183836 has a shallow recessed portion formed on an upper surface of a main body chassis, and a keyboard is attachable to and detachable from the recessed portion. In such a configuration, only the keyboard can be replaced when an issue occurs in the keyboard. Different types of keyboards can be attached according to the preference of an operator.

SUMMARY OF THE INVENTION

Incidentally, in a laptop computer in Japanese Unexamined Patent Application Publication No. 2007-183836, since a keyboard is fitted into a recessed portion, it is difficult to remove the keyboard. If a puller that protrudes upward is provided on a chassis upper surface of the keyboard, the keyboard can be easily removed, but the keyboard interferes with a display chassis, or there is a problem in a key input operation.

The present invention has been made in view of the above problems, and an object of the present invention is to provide a keyboard that is easily attached to and detached from a main body chassis, and an electronic apparatus including the keyboard.

In order to solve the above-described problems and achieve the object, according to a first embodiment of the present invention, there is provided an electronic apparatus including a main body chassis; and a keyboard attachable to and detachable from a recessed portion that is recessed downward from a main body upper surface of the main body chassis, in which a keyboard chassis of the keyboard is provided with a puller mechanism including a rail extending in parallel to the main body upper surface, a slider guided by the rail, and an elastic band provided above the rail, one end of which is fixed to the slider and the other end of which is fixed to the keyboard chassis, and the elastic band is linear and extends along the main body upper surface in a natural state without an external force, and is elastically curved by the one end being displaced together with the slider along the rail to protrude over the main body upper surface.

According to a second embodiment of the present invention, there is provided a keyboard that is attachable to and detachable from a main body chassis of an electronic apparatus, the keyboard including a pogo pin provided on a lower surface of the keyboard, in which a pogo pin connector is provided on a mounting portion of the keyboard in the main body chassis, and the keyboard is mounted on the mounting portion so that the pogo pin and the pogo pin connector are electrically connected.

In the above aspect of the present invention, the keyboard can be easily attached to and detached from the main body chassis.

DETAILED DESCRIPTION OF THE INVENTION

Hereinafter, an embodiment of an electronic apparatus and a keyboard according to the present invention will be described in detail with reference to the drawings. It should be noted that the present invention is not limited to the embodiment.

Figure 1:
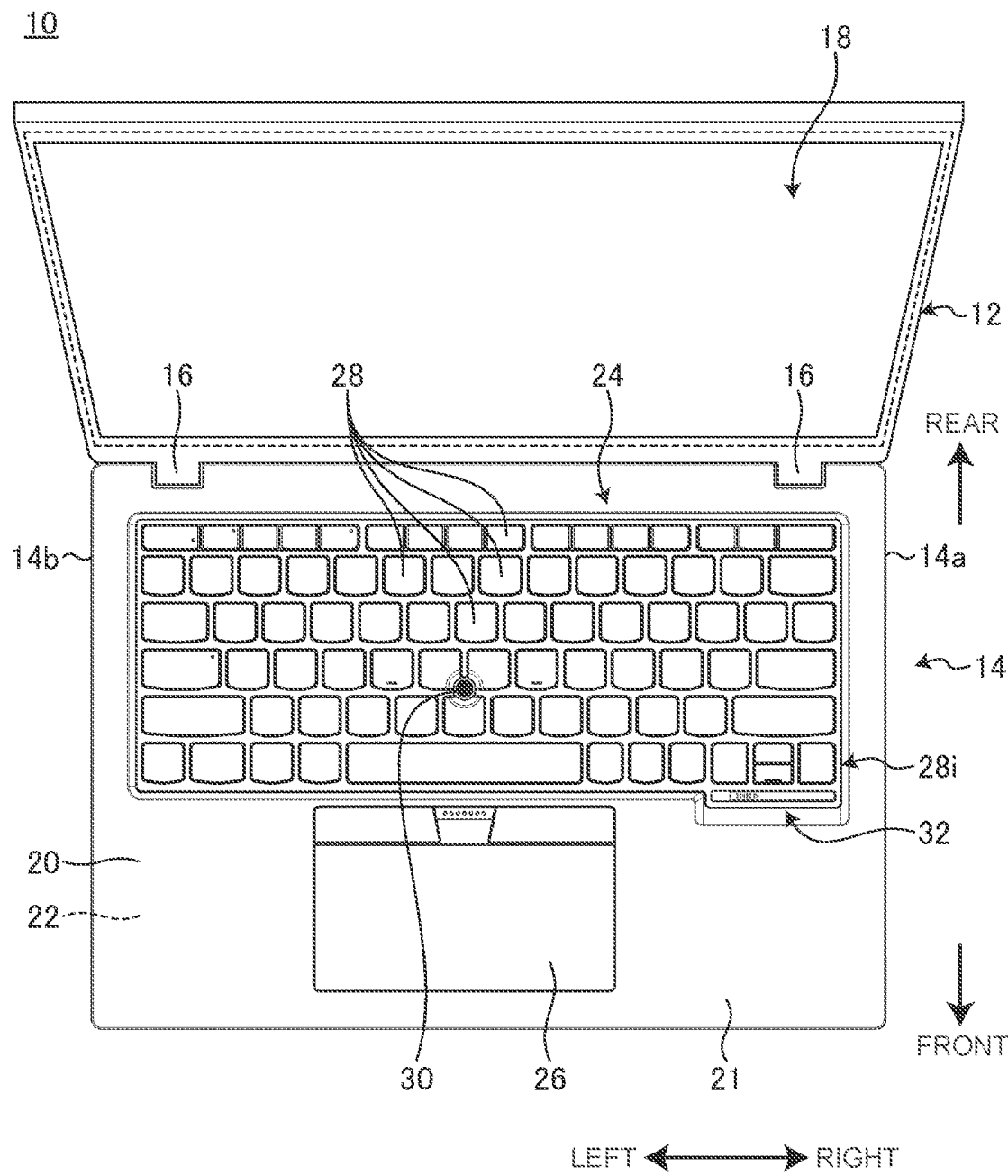
FIG. 1 is a schematic plan view of an electronic apparatus according to an embodiment when viewed from above.
Figure 2:
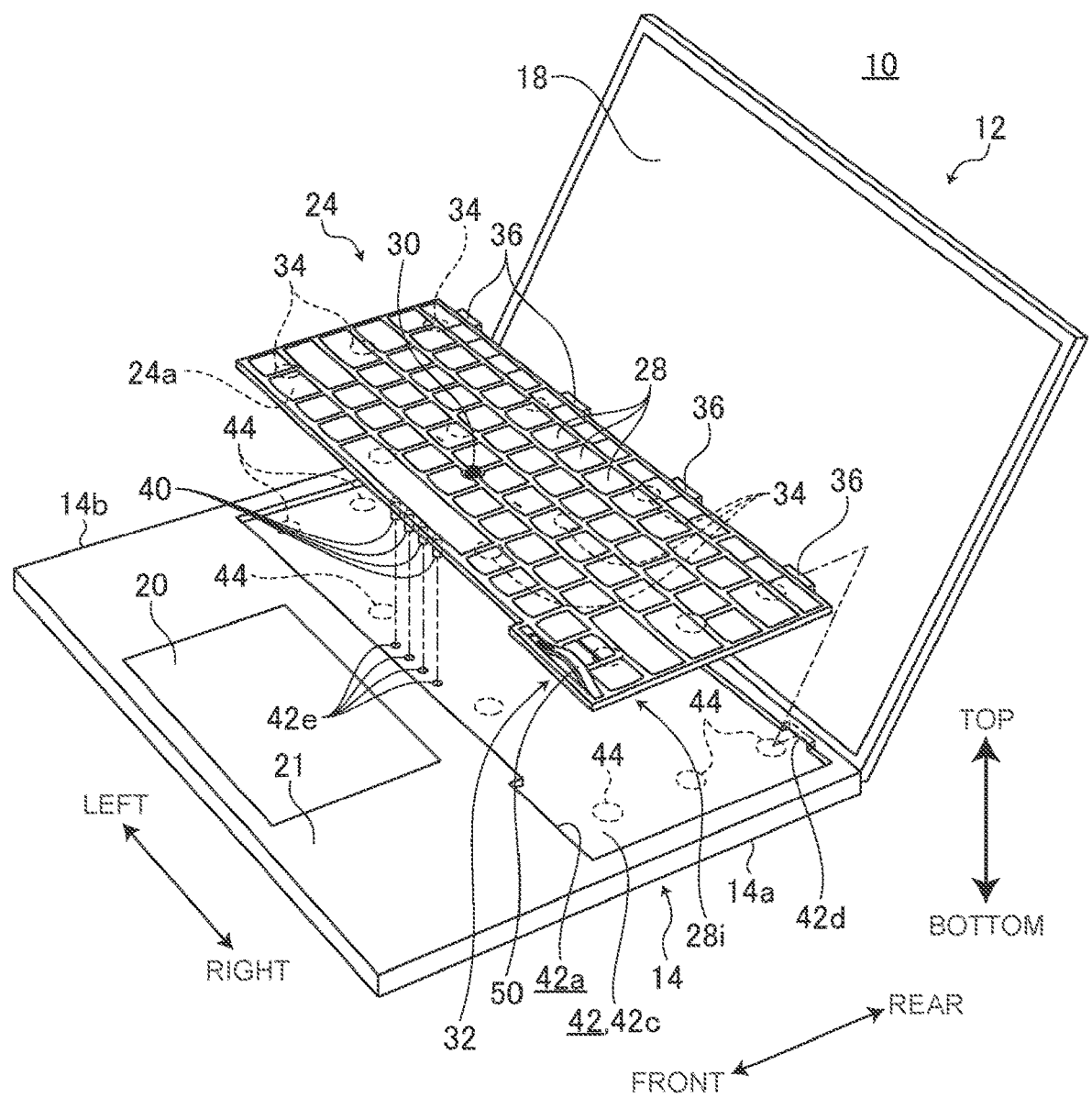
FIG. 2 is a perspective view of the electronic apparatus in a state in which a keyboard is removed.
Figure 3:
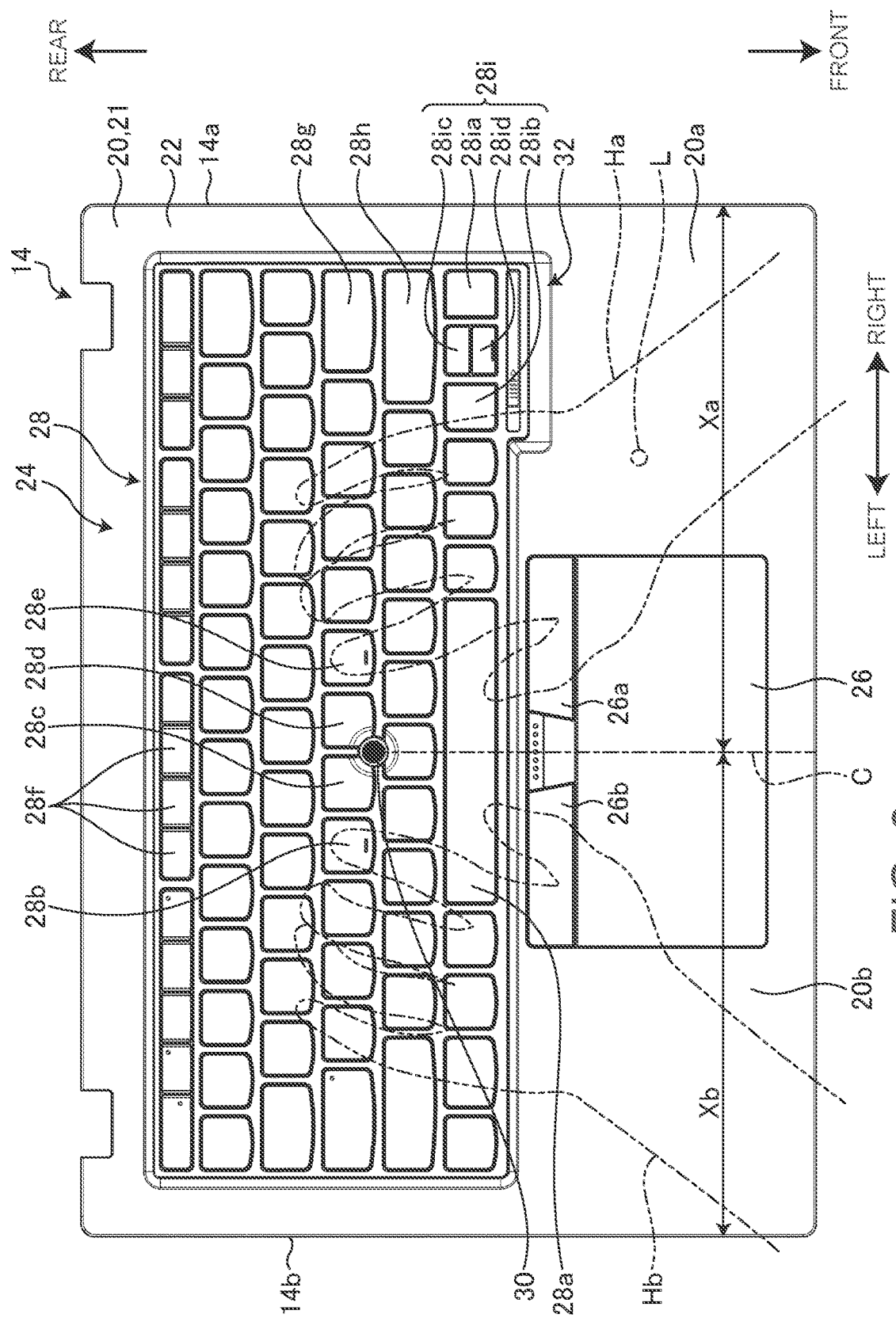
FIG. 3 is a plan view of a main body chassis.

FIG. 1 is a schematic plan view of an electronic apparatus 10 according to the embodiment when viewed from above. FIG. 2 is a perspective view of the electronic apparatus 10 in a state in which a keyboard 24 is removed. FIG. 3 is a plan view of a main body chassis 14.

The electronic apparatus 10 is a clamshell-shaped laptop PC in which a display chassis 12 and a main body chassis 14 are connected to be relatively rotatable via a hinge 16. In the electronic apparatus according to the present invention, the display chassis 12 is not an essential element and may be an apparatus in another form including a keyboard.

The display chassis 12 is a flat box body thinner than the main body chassis 14. A display 18 is mounted on the display chassis 12. The display 18 includes, for example, an organic EL (organic light emitting diode: OLED) or a liquid crystal display.

Hereinafter, the front, the rear, and left-right directions of the main body chassis 14 when viewed from an operator are defined, and the side on which the keyboard 24 is mounted is defined as the top, and the opposite side thereto is defined as the bottom, as appropriate in the drawings.

The hinge 16 is connected to a rear end portion of the main body chassis 14. The main body chassis 14 includes an upper cover material 20 forming an upper surface 21 and four peripheral side surfaces, and a lower cover material 22 forming a lower surface. The upper surface 21 of the upper cover material 20 configures an upper surface of the main body chassis 14. The main body chassis 14 forms a slightly laterally long and flat box body by combining the upper cover material 20 and the lower cover material 22.

The keyboard 24 is provided on a rear part of the upper surface 21 of the main body chassis 14, and a touch pad 26 is provided on a front part thereof. The keyboard 24 and the touch pad 26 are adjacent to each other. The touch pad 26 includes a right click portion 26a and a left click portion 26b. The right click portion 26a and the left click portion 26b are arranged on the left and right at the rearmost part. The right of the touch pad 26 on the front part of the upper surface 21 is an area used as a right palm rest 20a on which the right hand Ha is placed, and the left thereof is an area used as a left palm rest 20b on which the left hand Hb is placed, and each of the areas is flat.

The keyboard 24 has a normal size in a laptop PC, and a keyboard chassis 27 is provided with a plurality of keys 28, a pointing stick 30, a puller mechanism 32, a plurality of magnets 34, a plurality of hooks 36, and a plurality of pogo pins 40. The keyboard 24 is configured to be attachable to and detachable from the main body chassis 14. A configuration and an operation for attachment and detachment will be described later.

The plurality of keys 28 are arranged in 6 rows according to a predetermined standard. A central space key 28a in the frontmost row is adjacent to the touch pad 26. An F key 28b, a G key 28c, an H key 28d, and a J key 28e are arranged in the substantially center in the third row from the front. The F key 28b and the J key 28e are at positions corresponding to the index fingers of the right hand Ha and the left hand Hb at the home position. Function keys 28f and the like are arranged in the rearmost row. An enter key 28g and a shift key 28h on the right are slightly larger than the other keys.

Cursor keys 28i are disposed at the right end in the frontmost row. The cursor keys 28i include four keys such as a right key 28ia, a left key 28ib, an up key 28ic, and a down key 28id. The cursor keys 28i are disposed to be adjacent to the front part of the shift key 28h, and are slightly wider than the shift key 28h. The cursor keys 28i have the same depth and width as other keys in the frontmost row. Among the cursor keys 28i, the right key 28ia is on the right and the left key 28ib is on the left, and the up key 28ic and the down key 28id are disposed to be arranged between the right key 28ia and the left key 28ib.

The pointing stick 30 is a kind of a pointing device, is an input device that moves a cursor in a tilting direction, and is provided between the G key 28c and the H key 28d. Regarding the arrangement in the left-right direction, the center of the space key 28a and the touch pad 26 coincides with the pointing stick 30. This position is set as the operation center C. The operation center C is a position that is substantially the center of the right hand Ha and the left hand Hb when an operator performs normal key input.

Among the plurality of keys 28, the rightmost enter key 28g, the shift key 28h, and the cursor keys 28i are allocated with a slightly larger area than the other keys for reasons such as operability. Thus, the operation center C is set at a position slightly to the left of the physical center of the main body chassis 14. In other words, a distance Xa from a right edge 14a of the main body chassis 14 to the operation center C is larger than a distance Xb from a left edge 14b to the operation center Ca. The right palm rest 20a is wider than the left palm rest 20b.

The puller mechanism 32 has an elongated shape in the left-right direction when viewed from the operator side and is provided at a right end portion on the front part of the keyboard chassis 27, and more specifically, a width thereof in the left-right direction is provided to be the same as a width of the cursor keys 28i including the four keys. The puller mechanism 32 slightly protrudes toward the front part of the rectangular region in which the plurality of keys 28 are arranged. In a state in which the keyboard 24 is mounted on the main body chassis 14, the puller mechanism 32 is located on the right of the touch pad 26 because the puller mechanism 32 is provided at the right end of the keyboard 24. In other words, the puller mechanism 32 slightly interrupts the region of the right palm rest 20a.

As illustrated in FIG. 2, the keyboard 24 is attachable to and detachable from the main body chassis 14. The main body chassis 14 is formed with a shallow recessed portion (mounting portion) 42 recessed downward from the upper surface 21. The recessed portion 42 has a bottomed structure basically. The recessed portion 42 has a shape that follows the contour of the keyboard 24, and the keyboard 24 can be fitted thereinto. Since the keyboard 24 includes the puller mechanism 32, a mechanism accommodating portion 42a in which the puller mechanism 32 is accommodated is also provided in the recessed portion 42. In other words, the recessed portion 42 is a right end portion having the rectangular shape and has a shape in which the mechanism accommodating portion 42a slightly protrudes to the front part. The recessed portion 42 is surrounded by a low edge protrusion 42b (refer to FIG. 6). The edge protrusion 42b stabilizes the fitting of the keyboard 24 into the recessed portion 42 and has a design effect. By being fitted into the recessed portion 42, the key top of the key 28 of the keyboard 24 mounted on the main body chassis 14 is slightly protruded upward from the edge protrusion 42b.

The plurality (twelve in the present example) of magnets 34 are provided on the lower surface 24a of the keyboard 24 at an appropriate interval from each other. The plurality of magnets 44 are provided on a back part of the bottom surface 42c of the recessed portion 42. These magnets 44 are provided at positions facing the plurality of magnets 34 provided on the bottom surface of the keyboard 24, and the keyboard 24 is easily fixed to the main body chassis 14 by attracting the magnets 44 and the magnets 34.

The plurality of (four in the present example) hooks 36 are provided along the rear edge of the keyboard 24 at an appropriate interval from each other. That is, the hooks 36 are provided on the edge on the opposite side to the puller mechanism 32. An engagement hole 42d is provided at a position facing the hook 36 in a rear wall portion of the recessed portion 42. That is, the hook 36 is provided on the edge on the opposite side to the mechanism accommodating portion 42a.

When the keyboard 24 is mounted on the main body chassis 14, first, the keyboard 24 is slightly inclined such that the rear part is low, and the hook 36 is engaged with the engagement hole 42d, and then the front part thereof is lowered such that the magnets 44 and the magnets 34 attract each other and fixed. According to such engagement of the hook 36 with the engagement hole 42d, the keyboard 24 is more stable, and there is no concern that the keyboard 24 will fall off even when an impact or the like is applied. In the present example, the keyboard 24 has the protruding hook 36 and the recessed portion 42 has the recessed engagement hole 42d to provide an engagement action, but the unevenness may be reversed. When the attraction force between the magnet 44 and the magnet 34 is sufficiently strong, the hook 36 and the engagement hole 42d may be omitted. In a case where the keyboard 24 is held against the four peripheral walls of the recessed portion 42 with a frictional force, the magnets 44 and 34 may be omitted or the number thereof may be reduced.

The plurality of pogo pins 40 are provided on the lower surface 24a of the keyboard 24. The recessed portion 42 is provided with a plurality of pogo pin connectors 42e at positions corresponding to the pogo pins 40. When the keyboard 24 is mounted on the main body chassis 14, the pogo pins 40 and the pogo pin connectors 42e are electrically connected to enable the supply of power and signal transmission.

That is, the keyboard 24 according to the present embodiment is only fitted into and mounted on the recessed portion 42, and thus the pogo pins 40 and the pogo pin connectors 42e are electrically connected. The keyboard 24 is simply removed from the recessed portion 42, and thus the pogo pins 40 and the pogo pin connectors 42e are separated from each other in an aspect that will be described later. Therefore, the keyboard 24 is easily attached to and detached from the main body chassis 14 because the supply of power and signal transmission are automatically executed and not executed without the need to electrically perform any special operation on the main body chassis 14. The pogo pins 40 are present on the lower surface 24a of the keyboard 24 and do not stand out, and of course, there is no problem in a key input operation. Regarding the ease of connection using the pogo pin 40 and the pogo pin connector 42e, it is sufficient that the keyboard 24 is properly positioned on the mounting portion in the main body chassis 14 and the mounting portion need not necessarily have a recessed shape such as that of the recessed portion 42.

Depending on design conditions, a flexible cable may replace the pogo pin 40 and the pogo pin connector 42e. The flexible cable may be connected to at least one of a bottom surface 42c and a bottom surface of the keyboard 24 via a connector.

In such an electronic apparatus 10, since the keyboard 24 is attachable to and detachable from the main body chassis 14, only the keyboard 24 can be replaced when some problem occurs in the keyboard 24. Different types of keyboards 24 (for example, those in which sizes of the space key 28a and the enter key 28g are different) may be attached according to the preference of the operator.

The keyboard 24 of the electronic apparatus 10 can be easily and reliably fixed to the main body chassis 14 due to attraction between the magnet 34 and the magnet 44, simply by fitting the keyboard 24 into the recessed portion 42. On the other hand, when the keyboard 24 is removed from the main body chassis 14, the puller mechanism 32 is used. Hereinafter, the puller mechanism 32 will be described.

Figure 4:
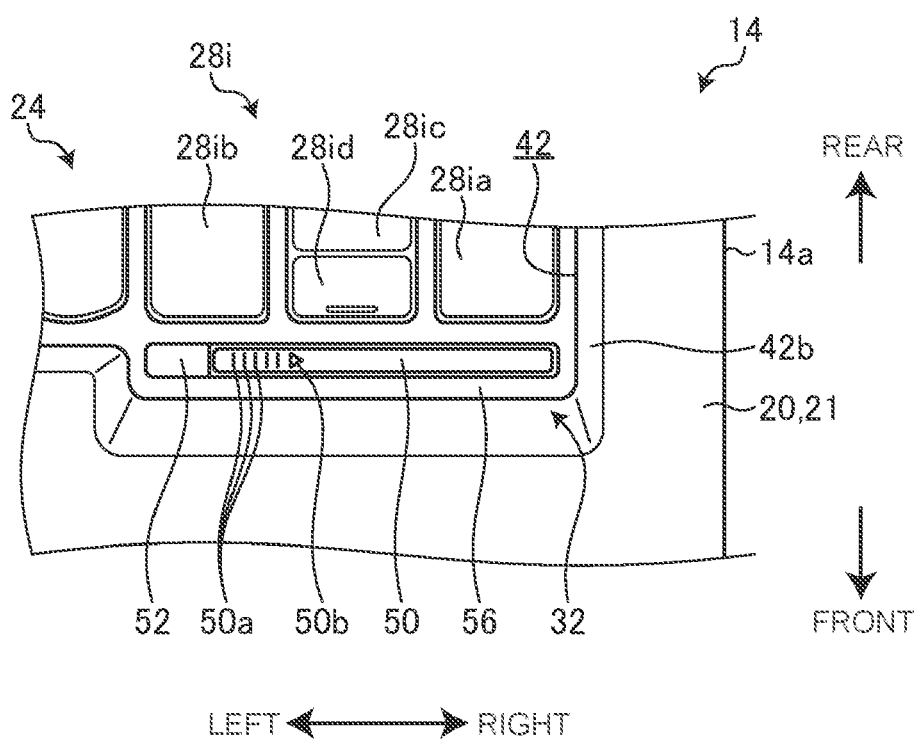
FIG. 4 is a plan view of a puller mechanism and a peripheral portion thereof in normal use.
Figure 5:
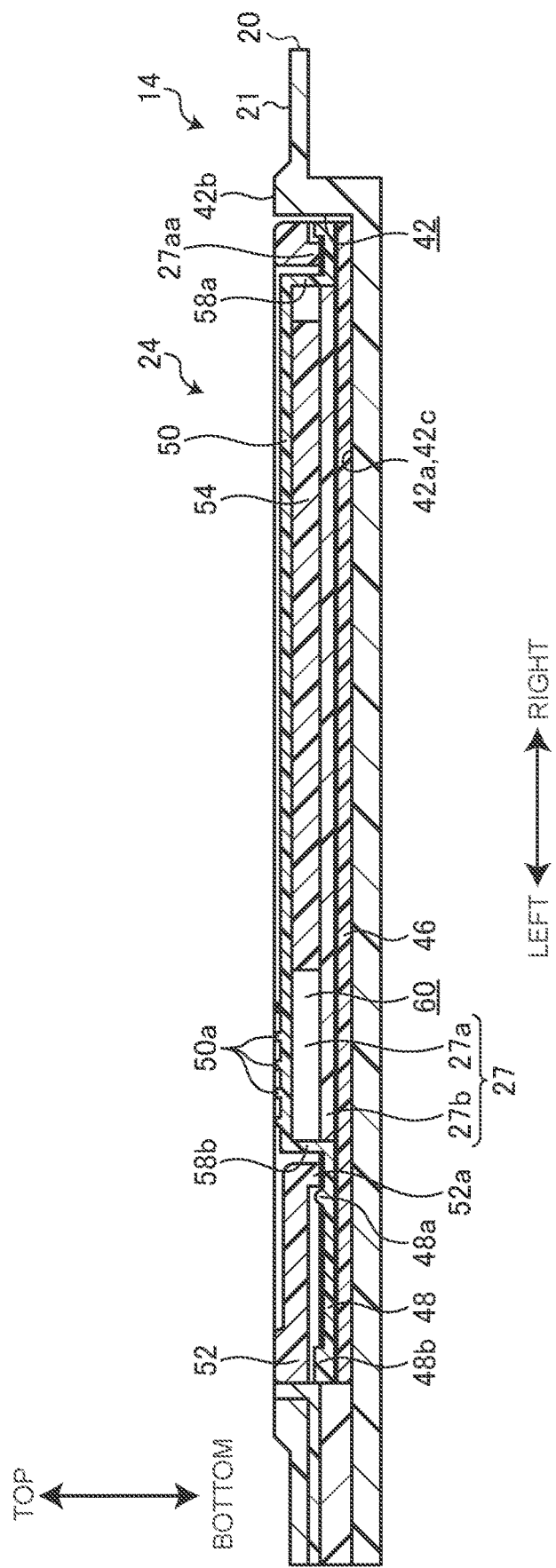
FIG. 5 is a schematic cross-sectional front view of the puller mechanism in normal use.

FIG. 4 is a plan view of the puller mechanism 32 and a peripheral portion thereof in normal use. FIG. 5 is a schematic cross-sectional front view of the puller mechanism 32 in normal use.

The keyboard chassis 27 is configured by combining an upper member 27a and a lower member 27b. The puller mechanism 32 is configured based on the keyboard chassis 27 of the keyboard 24, and includes a rail 46 extending parallel to the upper surface 21 of the main body chassis 14, a slider 48 guided in the left-right direction by the rail 46, an elastic band 50 provided above the rail 46, an end cover 52 provided on the left of the elastic band 50, and a support plate 54 that supports a lower surface of the elastic band 50.

First, the puller mechanism 32 will be described based on a normal use state. The normal use state is a state in which an operator performs a key operation in a state in which the keyboard chassis 27 is mounted on the main body chassis 14.

The elastic band 50 is a thin and elongated resin material in the height direction, and extends linearly in the left-right direction in a natural state without elastic deformation, and can be elastically curved when an external force in the compression direction is applied. The end cover 52 and the elastic band 50 are surrounded by a mechanism frame 56 and are aligned in the left-right direction. The end cover 52 is shorter than the elastic band 50 and has substantially the same length as the slider 48. As will be described later, the elastic band 50 is curved in a mountain shape and protrudes upward (refer to FIG. 7), and thus an appropriate length required to be curved is secured, and correspondingly, lengths of the end cover 52 and the slider 48 are appropriately suppressed. Since the end cover 52 is set to be appropriately short, the overall width of the puller mechanism 32 in the left-right direction is the same as that of the cursor keys 28i. The end cover 52 is fixed to the upper member 27a or is molded as a part of the upper member 27a. An engagement protrusion 52a protruding downward is provided at a lower part of a right end of the end cover 52.

The right end of the elastic band 50 is fixed to a lower part of a right end portion 27aa of the upper member 27a via a crank portion 58a in the up-down direction. The left end of the elastic band 50 is fixed to the right end of the slider 48 via a crank portion 58b in the up-down direction. The elastic band 50 is held slightly higher than the rail 46 and at the same height as the end cover 52 by the crank portions 58a and 58b. The front surfaces of the elastic band 50 and the end cover 52 are set to have substantially the same height as the upper surface 21 of the main body chassis 14, and more specifically, the same height as the edge protrusion 42b, lower than the key top of the plurality of keys 28, does not hinder an operation of the key 28, and of course does not interfere with the display chassis 12. A plurality of small bars 50a in the depth direction are provided on the left portion of the front surface of the elastic band 50 to prevent slipping. On the right of the plurality of bars 50a, triangular marks 50b indicating an operation direction are provided.

The support plate 54 is fixed to the upper member 27a or is molded as a part of the upper member 27a. The elastic band 50 is supported by the support plate 54 and thus is not bent downward. Due to the presence of the support plate 54, the inside is not exposed when the elastic band 50 is curved (refer to FIG. 6). A space 60 that allows the displacement of the slider 48 is secured between the support plate 54 and the end cover 52.

The upper surface of the slider 48 is provided with a small protrusion 48a in the vicinity of the right end, and a stopper protrusion 48b is provided at the left end. In normal use, the protrusion 48a abuts the engagement protrusion 52a of the end cover 52 from the left to prevent the slider 48 from being inadvertently displaced. The elastic band 50 is linear in a natural state without an external force. Basically, the slider 48 is not displaced due to shaking, gravity, or the like but is more stable due to the action of the protrusion 48a.

Figure 6:
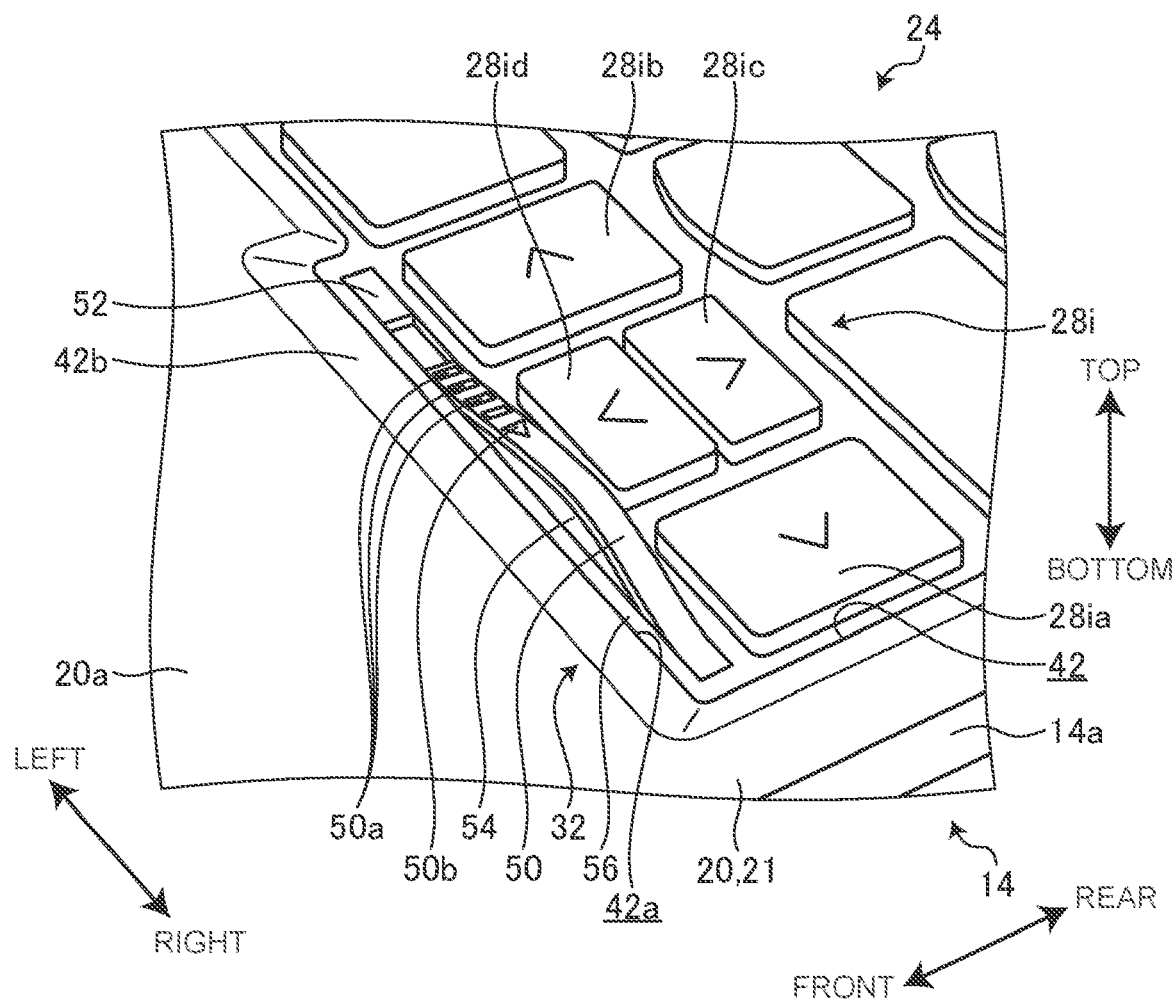
FIG. 6 is a perspective view of the puller mechanism and the periphery thereof in a state in which an elastic band is curved.
Figure 7:
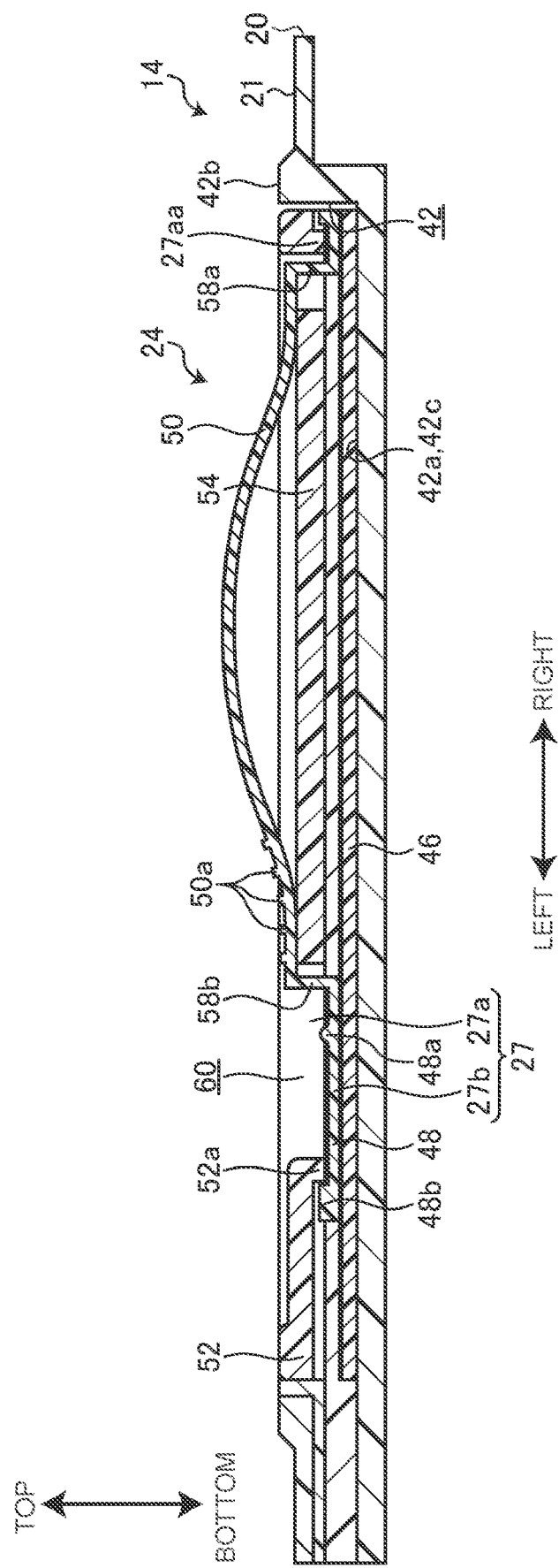
FIG. 7 is a schematic cross-sectional front view of the puller mechanism in a state in which the elastic band is curved.
Figure 8:
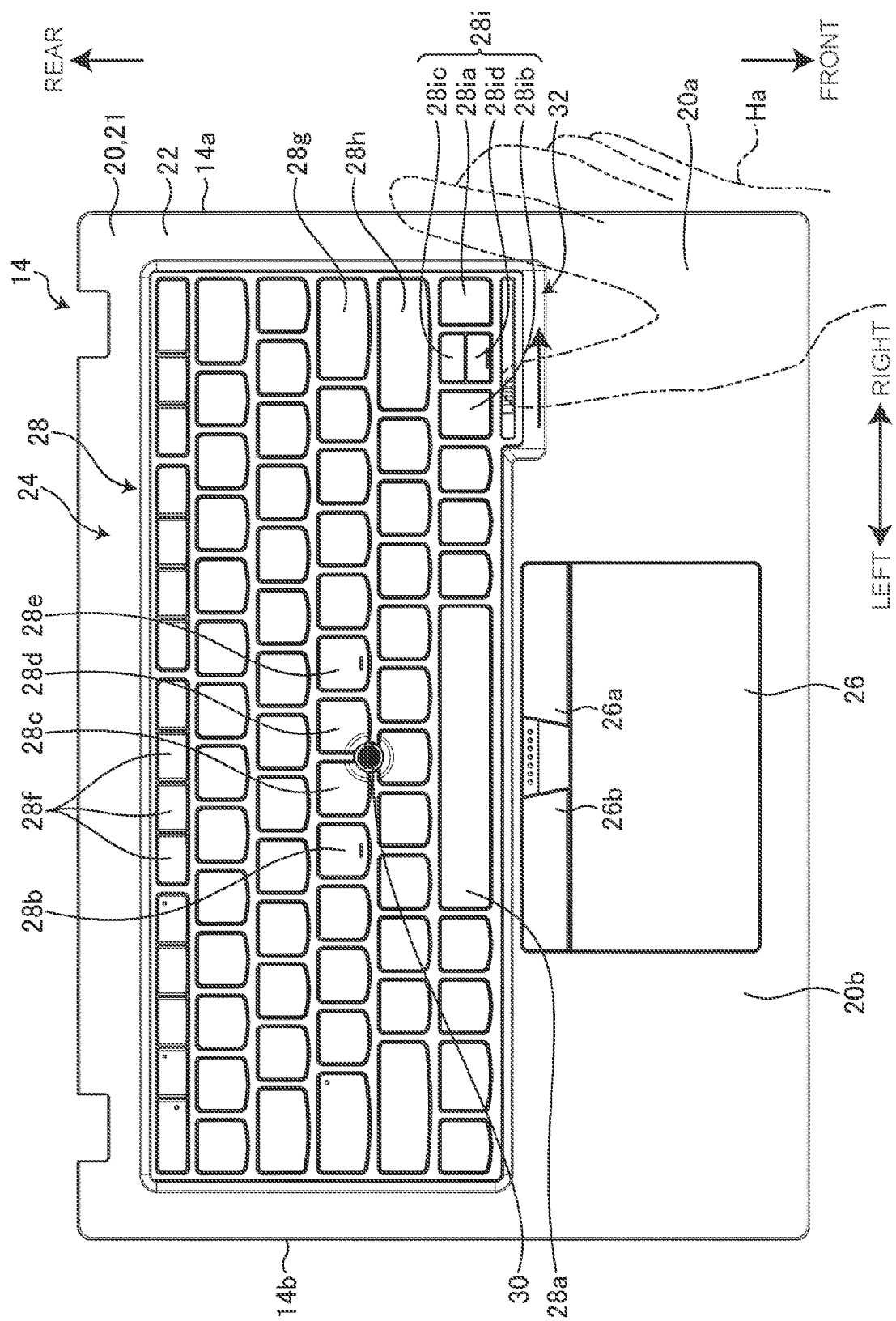
FIG. 8 is a plan view of the main body chassis illustrating that the elastic band is being operated.

FIG. 6 is a perspective view of the puller mechanism 32 and the periphery thereof in a state in which the elastic band 50 is curved. FIG. 7 is a schematic cross-sectional front view of the puller mechanism 32 in a state in which the elastic band 50 is curved. FIG. 8 is a plan view of the main body chassis 14 illustrating a state in which the elastic band 50 is being operated.

When a force is applied to the right while putting a finger on the bar 50a at the left end portion of the elastic band 50, engagement portions of the protrusion 48a and the engagement protrusion 52a get over each other. In this case, as indicated by a virtual line in FIG. 8, when the right thumb is brought into contact with the left end portion of the elastic band 50, and the other fingers are brought into contact with the right edge 14a of the main body chassis 14 to apply an appropriate force, an operation can be easily performed.

The left end portion of the elastic band 50 is displaced to the right together with the slider 48, and the central portion thereof is elastically and appropriately curved to be convex upward. The operation of the slider 48 is restricted when the stopper protrusion 48b abuts on the engagement protrusion 52a from the left. Consequently, it is possible to prevent the elastic band 50 from being excessively bent and plastically deformed. An engagement portion is provided in the stopper protrusion 48b and the engagement protrusion 52a, and the slider 48 is temporarily fastened due to light engagement between the stopper protrusion 48b and the engagement protrusion 52a (including biting of a wedge), and thus the curved state of the elastic band 50 is maintained even if the fingers are released.

Figure 9:
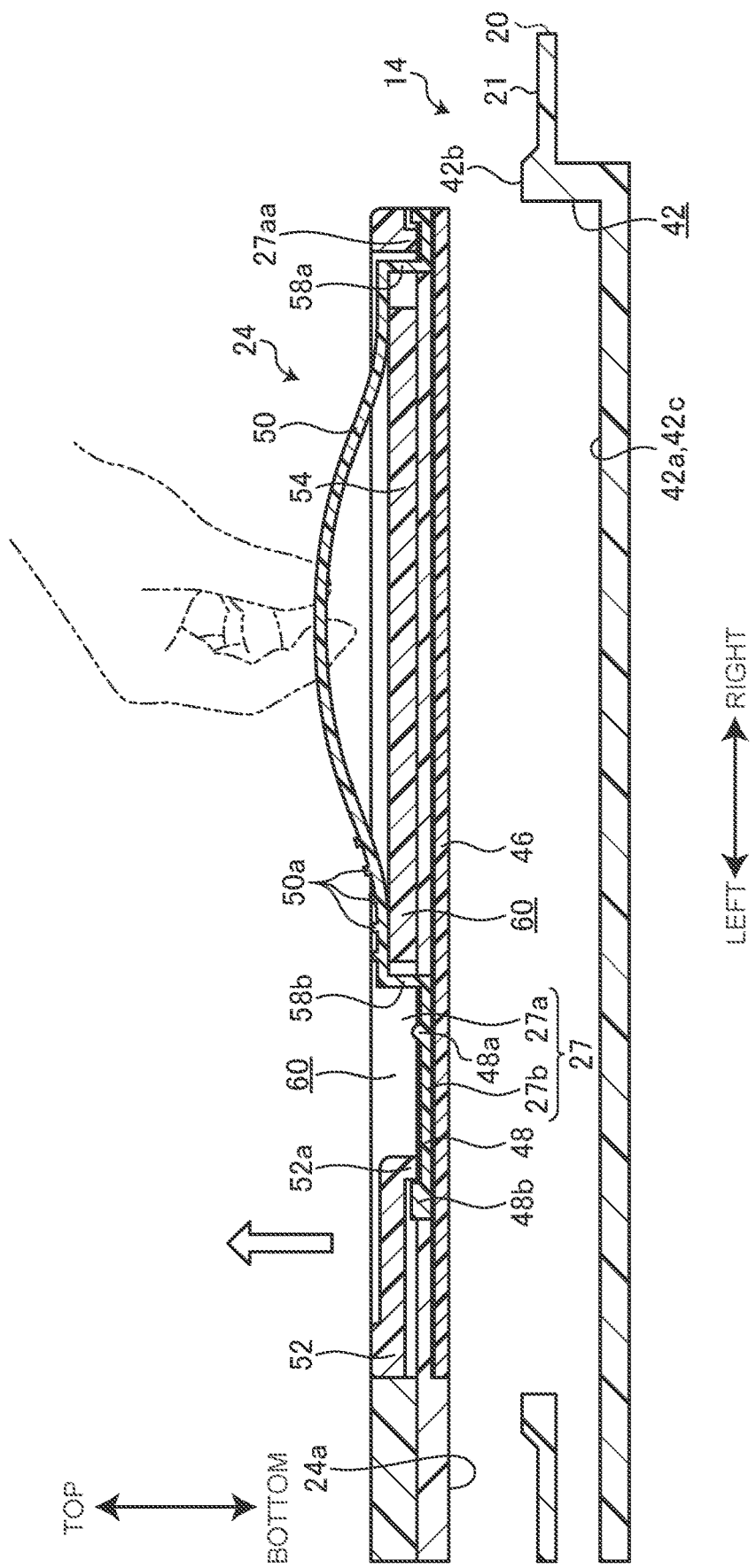
FIG. 9 is a schematic cross-sectional front view of the puller mechanism in a state in which the keyboard is pulled up from a recessed portion.

FIG. 9 is a schematic cross-sectional front view of the puller mechanism 32 in a state in which the keyboard 24 is pulled up from the recessed portion 42. The elastic band 50 is appropriately curved upward, and as indicated by a virtual line in FIG. 9, the keyboard 24 is pulled out from the recessed portion 42 and can be easily separated from the main body chassis 14 by gripping and pulling up the keyboard 24 with the finger. The hook 36 is engaged with the engagement hole 42d on the rear part of the keyboard 24, whereas the puller mechanism 32 is on the opposite front part, so that the front part is first reasonably pulled upward, and then, the hook 36 is easily pulled out from the engagement hole 42d by being diagonally pulled out from the recessed portion 42.

After the keyboard 24 is pulled out from the main body chassis 14, the central portion of the curved elastic band 50 is lightly pressed or the left end portion thereof is operated toward the left to release the engagement between the stopper protrusion 48b and the engagement protrusion 52a such that the protrusion 48a further gets over the engagement protrusion 52a, and the elastic band 50 returns to the state in FIG. 5.

In the electronic apparatus 10 configured as described above, basically, the keyboard 24 can be easily attached to the main body chassis 14 by being simply fitted into the recessed portion 42. The elastic band 50 of the puller mechanism 32 is linear in a natural state without an external force and extends and is stored along the upper surface 21. Therefore, an operation on the key 28 is not hindered. The left end of the elastic band 50 is elastically curved by being displaced along the rail 46 along with the slider 48 and protrudes from the upper surface 21. Therefore, if the protruding portion is gripped and pulled up, the keyboard 24 can be easily removed from the main body chassis 14. This operation is easy and can be intuitively understood without referring to a manual or the like.

The keyboard 24 of the electronic apparatus 10 is attached to the main body chassis 14 without using screws, an adhesive tape, or the like, and basically no tool or the like is required when the keyboard 24 is removed. However, fasteners such as screws may be added as an auxiliary depending on design conditions.

On the upper surface 21 of the main body chassis 14 in the electronic apparatus 10, since the operation center C and the touch pad 26 operated by the human hands Ha and Hb (refer to FIG. 3) are shifted to the left from the physical center, the right palm rest 20a is wider than the left palm rest 20b. The puller mechanism 32 is provided in the region of the wider right palm rest 20a, and the layout is reasonable and well-balanced.

The puller mechanism 32 is provided in the left-right direction when viewed from the operator side, and at the right end portion of the front part of the keyboard chassis 27. Therefore, as indicated by the virtual line in FIG. 3, the portion of the puller mechanism 32 does not give a sense of discomfort to an operator because the right hand Ha placed at the home position and the palm portion that rotates around the wrist L hardly abut on the puller mechanism 32 and the mechanism frame 56 (refer to FIG. 6) therearound or the edge protrusion 42b.

The left end of the elastic band 50 is fixed to the slider 48 and the right end thereof is fixed to the keyboard chassis 27, and thus, as illustrated in FIG. 8, it is easy to operate the elastic band 50 to the right with the thumb of the right hand Ha.

The puller mechanism 32 is provided such that the width thereof in the left-right direction when viewed from the operator side matches the width of the plurality of cursor keys 28i, and has a cohesive design. In a case where the puller mechanism 32 is not provided according to specifications of the keyboard 24, it is possible to increase an area of the cursor keys 28i up to the location of the puller mechanism 32 to improve the operability.

The present invention is not limited to the above-described embodiment, and there is no doubt that the present invention can be freely changed without departing from the concept of the present invention.

The invention claimed is:

1. An electronic apparatus comprising: a main body chassis; and a keyboard attachable to and detachable from a recessed portion that is recessed downward from a main body upper surface of the main body chassis, wherein a keyboard chassis of the keyboard includes a puller mechanism in an edge protrusion of a front part of the keyboard chassis, wherein the puller mechanism is adjacent to a top surface of a key in the keyboard, the puller mechanism having: a rail extending in parallel to the main body upper surface, a slider guided by the rail, and an elastic band above the rail, one end of which is fixed to the slider and another end of which is fixed to the keyboard chassis, and the elastic band is linear and extends along the main body upper surface in a natural state without an external force, and is elastically curved by the one end being displaced together with the slider along the rail and thereby protrudes over the main body upper surface.

2. The electronic apparatus according to claim 1, wherein the keyboard chassis includes an engagement protrusion that is engaged to and fastened with the slider when the elastic band is elastically curved.

3. The electronic apparatus according to claim 1, wherein the main body upper surface includes a touch pad at a position on a front part of the main body chassis and closer to a left thereof than to a center thereof when viewed from an operator side, and
the puller mechanism is to the right of the touch pad.

4. The electronic apparatus according to claim 1, wherein the puller mechanism is at a right end portion on a front part of the keyboard chassis in a left-right direction when viewed from an operator side, and
a left end of the elastic band is fixed to the slider, and a right end of the elastic band is fixed to the keyboard chassis.

5. The electronic apparatus according to claim 4, wherein the keyboard has a plurality of cursor keys on a right end front portion of the main body chassis when viewed from the operator side, and
the puller mechanism has a width in the left-right direction when viewed from the operator side that matches a width of the plurality of cursor keys.

6. The electronic apparatus according to claim 4, wherein the keyboard is engaged with the main body chassis by a protrusion being fitted into a recess on a rear part of the main body chassis when viewed from the operator side.

7. The electronic apparatus according to claim 1, wherein the keyboard is attracted to and fixed to the main body chassis by magnets.

8. The electronic apparatus according to claim 1, wherein the keyboard includes a pogo pin on a lower surface thereof, and the pogo pin is electrically connected to a pogo pin connector in the recessed portion.

\* \* \* \* \*